United States Patent
Chang et al.

(10) Patent No.: US 8,599,349 B2
(45) Date of Patent: Dec. 3, 2013

(54) DISPLAY PANEL

(75) Inventors: Wen-Zong Chang, Kaohsiung (TW); Chin-An Tseng, Taipei (TW); Hsiao-Wei Cheng, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 171 days.

(21) Appl. No.: 13/369,278

(22) Filed: Feb. 8, 2012

(65) Prior Publication Data

US 2013/0127696 A1    May 23, 2013

(30) Foreign Application Priority Data

Nov. 23, 2011   (TW) .............................. 100142896 A (51) Int. Cl.
*G09G 3/36* (2006.01)
(52) U.S. Cl.
USPC ......................................................... 349/141
(58) Field of Classification Search
USPC ......................................................... 349/141
See application file for complete search history.

(56) References Cited

U.S. PATENT DOCUMENTS

| 6,320,637 | B1 * | 11/2001 | Kim et al. ..................... 349/141 |
| 6,441,878 | B1 * | 8/2002 | Wong ............................ 349/143 |
| 7,209,205 | B2 * | 4/2007 | Yoshida et al. ............... 349/139 |
| 7,667,809 | B2 | 2/2010 | Kazuyoshi et al. |
| 7,728,941 | B2 | 6/2010 | Jin et al. |
| 7,768,597 | B2 | 8/2010 | Chang |
| 8,107,046 | B2 * | 1/2012 | Jin et al. ....................... 349/141 |
| 8,284,365 | B2 * | 10/2012 | Park et al. ..................... 349/141 |
| 2005/0094077 | A1 * | 5/2005 | Baek ............................ 349/141 |
| 2005/0140897 | A1 * | 6/2005 | Kim ............................. 349/141 |
| 2008/0151136 | A1 * | 6/2008 | Jung et al. ..................... 349/46 |
| 2011/0122342 | A1 | 5/2011 | Nishimura et al. |
| 2011/0187950 | A1 | 8/2011 | Matsushima et al. |
| 2013/0229449 | A1 * | 9/2013 | Yun et al. ..................... 345/697 |

FOREIGN PATENT DOCUMENTS

TW           200825586         6/2008

* cited by examiner

*Primary Examiner* — Van Chow
(74) *Attorney, Agent, or Firm* — Jianq Chyun IP Office (57) ABSTRACT

A display panel includes a first substrate, scan lines, data lines, pixel units, a second substrate, a display medium, and a color filter layer. The scan lines and the data lines are disposed on the first substrate. The pixel units are electrically connected to the scan lines and the data lines. Each pixel unit includes first, second, third, and fourth pixels. An extension direction of slit patterns of the first and second pixels is different from an extension direction of slit patterns of the third and fourth pixels. The color filter layer includes a first color filter pattern, a second color filter pattern, a third color filter pattern, and a fourth color filter pattern respectively corresponding to the first, second, third, and fourth pixel. The color of the fourth color filter pattern is different from the colors of the first, second, and third color filter patterns.

14 Claims, 7 Drawing Sheets

DISPLAY PANEL

CROSS-REFERENCE TO RELATED APPLICATION

This application claims the priority benefit of Taiwan application serial no. 100142896, filed on Nov. 23, 2011. The entirety of the above-mentioned patent application is hereby incorporated by reference herein and made a part of this specification.

BACKGROUND OF THE INVENTION

1. Field of the Invention

The invention relates to a display panel, and more particularly, to a fringe field switching (FFS) liquid crystal display (LCD) panel.

2. Description of Related Art

Recently, with continuing maturation of photoelectric technology and semiconductor fabrication, development of flat panel displays is booming. Among the flat panel displays, liquid crystal displays (LCDs) free of harmful radiation and characterized by low operating voltage, light weight, and small volume have gradually replaced conventional cathode ray tube (CRT) displays and have become mainstream display products. However, the LCDs are still subject to the limited viewing angles. At this current stage, displays capable of satisfying the requirement for large viewing angle include a twisted nematic (TN) LCD equipped with a wide viewing film, an in-plane switching (IPS) LCD, a fringe field switching (FFS) LCD, a multi-domain vertical alignment (MVA) display, and so on.

The existing FFS LCD encounters the color shift issue. Specifically, red, blue, and green pixels at large viewing angles may be accompanied with color shift to different extent. To resolve said issue, the red, blue, and green pixels are designed to have two domains according to the related art. Nonetheless, disclination lines may be generated in the middle of the red, blue, and green pixels with two domains, thus deteriorating the display quality of the display.

SUMMARY OF THE INVENTION

The invention is directed to a display panel for resolving an issue arising in a conventional FFS LCD panel.

In the invention, a display panel including a first substrate, a plurality of scan lines, a plurality of data lines, a plurality of pixel units, a second substrate, a display medium, and a color filter layer is provided. The scan lines and the data lines are disposed on the first substrate. The pixel units are electrically connected to the scan lines and the data lines, and each of the pixel units includes a first pixel, a second pixel, a third pixel, and a fourth pixel. Each of the first pixel, the second pixel, the third pixel, and the fourth pixel includes an active device, a pixel electrode, and a common electrode. The pixel electrode is electrically connected to the active device, the common electrode is disposed corresponding to the pixel electrode, and one of the pixel electrode and the common electrode has at least one slit pattern. The slit pattern of the first pixel and the slit pattern of the second pixel have a first extension direction, the slit pattern of the third pixel and the slit pattern of the fourth pixel have a second extension direction, and the first extension direction is different from the second extension direction. The second substrate is located opposite to the first substrate. The display medium is located between the first substrate and the second substrate. The color filter layer includes a first color filter pattern disposed corresponding to the first pixel, a second color filter pattern disposed corresponding to the second pixel, a third color filter pattern disposed corresponding to the third pixel, and a fourth color filter pattern disposed corresponding to the fourth pixel. The color of the fourth color filter pattern is different from the colors of the first, second, and third color filter patterns.

Based on the above, the extension direction of the slit pattern of the first pixel and the slit pattern of the second pixel is different from the extension direction of the slit pattern of the third pixel and the slit pattern of the fourth pixel. In addition, the color of the fourth color filter pattern is different from the colors of the first, second, and third color filter patterns. Accordingly, said design may resolve the color shift issue arising in the display panel when an image on the display panel is viewed at large viewing angles. Moreover, since the pixel described herein is not equipped with two domains, the issue of disclination lines in the conventional pixel does not arise, and thus the display quality of the display is not deteriorated.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

FIG. 2 is a schematic cross-sectional view illustrating a display panel according to an embodiment of the invention. Here, FIG. 2 is taken along section lines I-I' and II-II' of the display panel depicted in FIG. 1.

DESCRIPTION OF EMBODIMENTS

Figure 1:
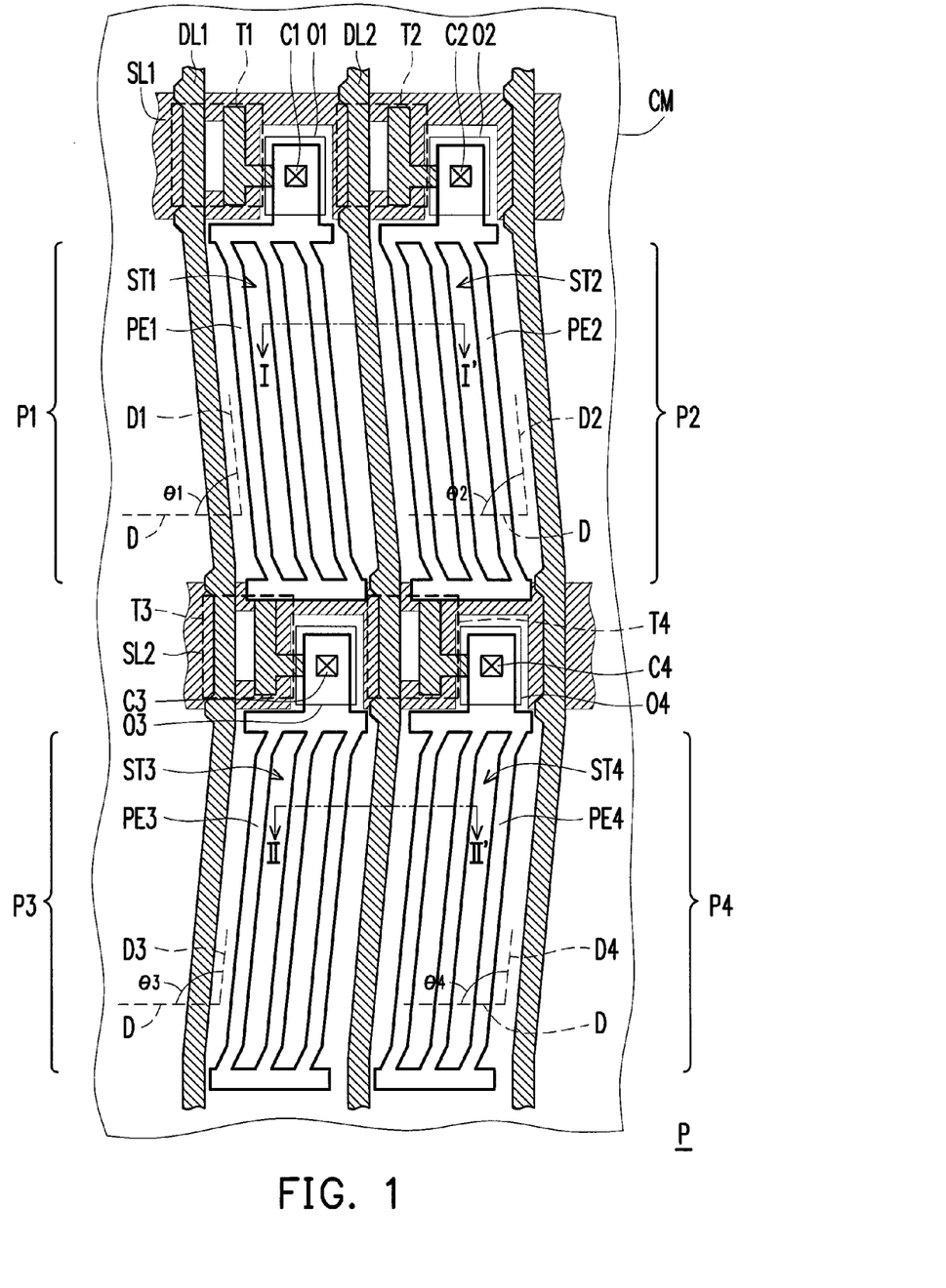
FIG. 1 is a schematic top view illustrating a display panel according to an embodiment of the invention.
Figure 2:
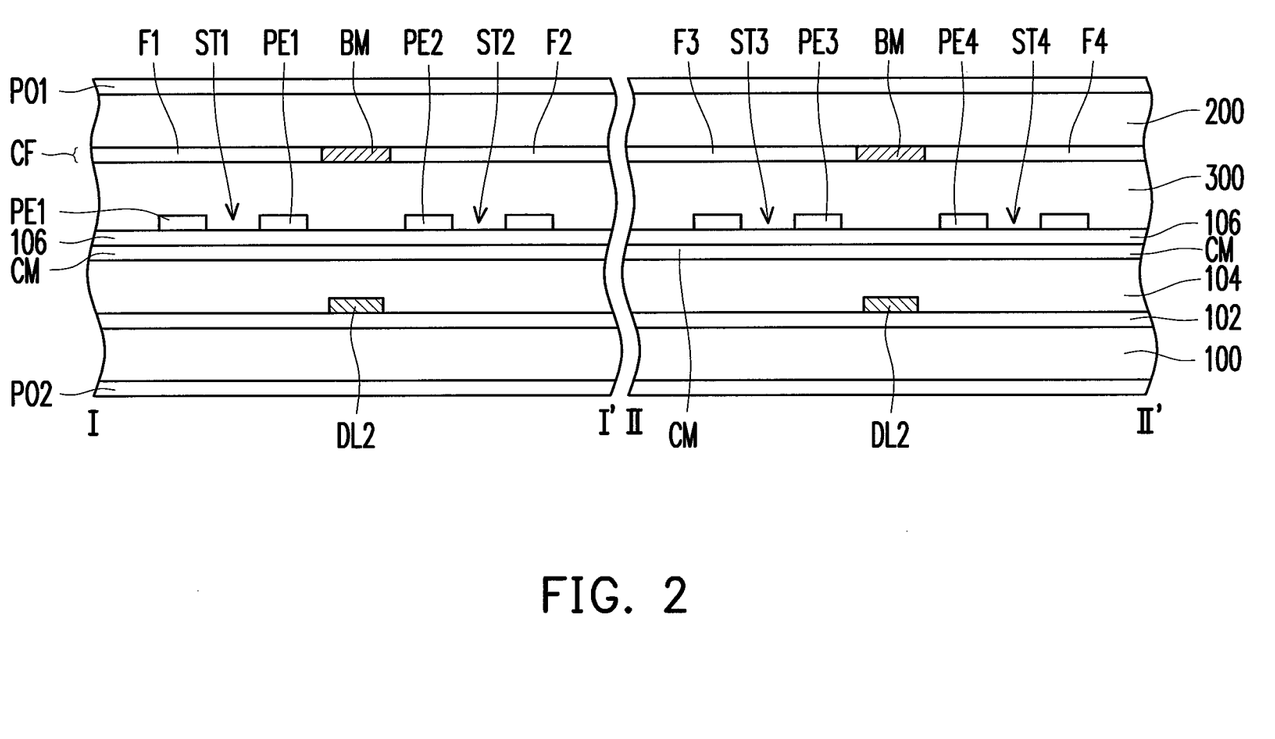

FIG. 1 is a schematic top view illustrating a display panel according to an embodiment of the invention. FIG. 2 is a schematic cross-sectional view illustrating a display panel according to an embodiment of the invention. Here, FIG. 2 is taken along section lines I-I' and II-II' of the display panel depicted in FIG. 1. With reference to FIG. 1 and FIG. 2, the display panel of the present embodiment includes a first substrate 100, a plurality of scan lines SL1~SLn, a plurality of data lines DL1~DLm, a plurality of pixel units P, a second substrate 200, a display medium 300, and a color filter layer CF.

The first substrate 100 has a pixel array thereon. The scan lines SL1~SLn and the data lines DL1~DLm are disposed on the first substrate 100; in FIG. 1, only the scan lines SL1, SL2 and the data lines DL1, DL2 are exemplarily shown. The pixel units P are electrically connected to the scan lines SL1~SLn and the data lines DL1~DLm, and each of the pixel units P includes a first pixel P1, a second pixel P2, a third pixel P3, and a fourth pixel P4.

The scan lines SL1~SLn cross over the data lines DL1~DLm to define a plurality of pixel regions. An insulation layer 102 is sandwiched between the scan lines SL1~SLn and the data lines DL1~DLm. In consideration of electrical conductivity, the data lines DL1~DLm and the scan lines SL1~SLn are often made of metal materials. However, the invention is not limited thereto. According to other embodiments, the scan lines SL1~SLn and the data lines DL1~DLm may also be made of other conductive materials. For instance, the scan lines SL1~SLn and the data lines DL1~DLm may be made of an alloy, metal nitride, metal oxide, metal oxynitride, another appropriate material, or a layer in which a metal material and any other conductive material are stacked together.

As described above, the scan lines SL1~SLn and the data lines DL1~DLm define a plurality of unit regions arranged in columns and rows on the substrate 100. Particularly, the scan lines SL1~SLn are arranged in rows from top to bottom, while the data lines DL1~DLm are arranged in columns from left to right. The first, second, third, and fourth pixels P1~P4 are disposed in the unit regions that are arranged in columns and rows and defined by the scan lines SL1~SLn and the data lines DL1~DLm. In the present embodiment, the first pixel P1 and the second pixel P2 are arranged in one row, and the third pixel P3 and the fourth pixel P4 are arranged in another row. To be more specific, if the first pixel P1 and the second pixel P2 are arranged in the first row, the third pixel P3 and the fourth pixel P4 are arranged in the second row. It should be mentioned that the arrangement of the first, second, third, and fourth pixels P1~P4 is not limited herein. Namely, in other embodiments, the first, second, third, and fourth pixels P1~P4 may all be arranged in the same row.

Figure 6A:
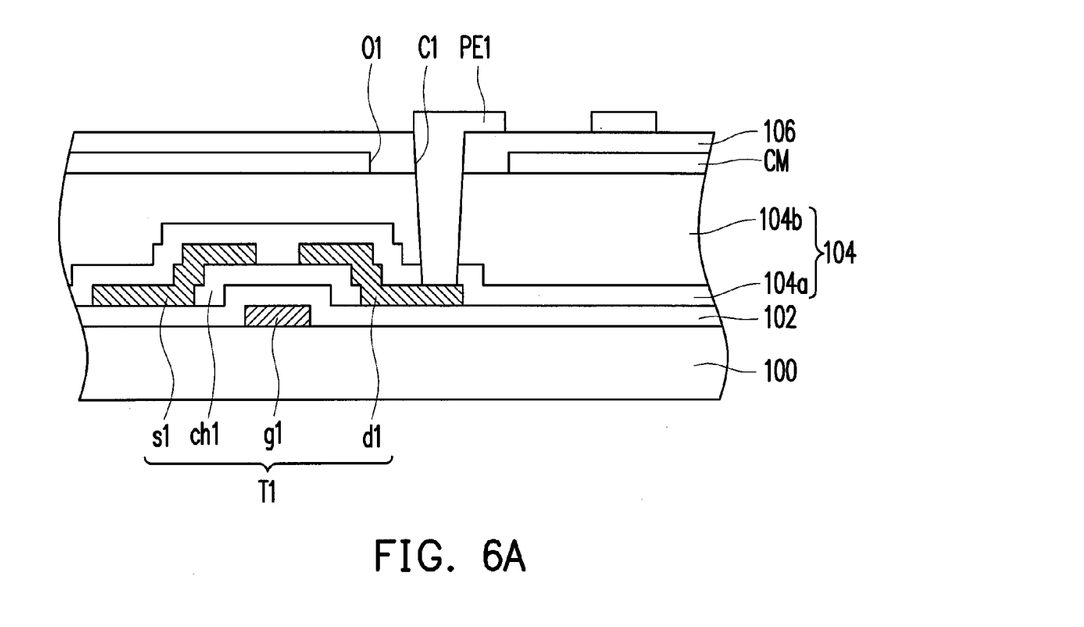
FIG. 6A is a schematic cross-sectional view illustrating a first pixel in a pixel unit according to an embodiment of the invention.

The first pixel P1 includes an active device T1, a pixel electrode PE1, and a common electrode CM. According to the present embodiment, the common electrode CM is disposed on an insulation layer 104, the pixel electrode PE1 is correspondingly disposed above the common electrode CM, and the pixel electrode PE1 and the common electrode CM are isolated from each other by an insulation layer 106. The pixel electrode PE1 is electrically connected to the active device T1. In particular, the pixel electrode PE1 is electrically connected to the active device T1 through a contact window C1 penetrating the insulation layers 104 and 106. As shown in FIG. 6A, the active device T1 includes a gate g1, a channel ch1, a source s1, and a drain d1, and the pixel electrode PE1 is electrically connected to the drain d1 through the contact window C1. Besides, the common electrode CM has an opening O1, such that the contact window C1 penetrating the insulation layers 104 and 106 is not in electrical contact with the common electrode CM. Here, the insulation layer 104 may include a passivation layer 104a and a planarization layer 104b; the passivation layer 104a is, for instance, made of an inorganic material, and the planarization layer 104b is, for instance, made of an organic material, which should not be construed as limitations to the invention.

According to the present embodiment, the common electrode CM is disposed below the pixel electrode PE1, and the common electrode CM and the pixel electrode PE1 are isolated from each other by the insulation layer 106. In addition, the pixel electrode PE1 has at least one slit pattern ST1 that extends toward a direction D1. Since the slit pattern ST1 of the pixel electrode PE1 has one single extension direction D1, the first pixel P1 has one domain. According to the present embodiment, the common electrode CM is disposed below the pixel electrode PE1, and the slit pattern ST1 is formed in the pixel electrode PE1, for instance; however, the invention is not limited thereto. According to another embodiment, the common electrode CM may also be disposed above the pixel electrode PE1, and the slit pattern ST1 may be formed in the common electrode CM.

The second pixel P2 includes an active device T2, a pixel electrode PE2, and a common electrode CM. According to the present embodiment, the common electrode CM is disposed on the insulation layer 104, the pixel electrode PE2 is correspondingly disposed above the common electrode CM, and the pixel electrode PE2 and the common electrode CM are isolated from each other by the insulation layer 106. The pixel electrode PE2 is electrically connected to the active device T2. Similarly, the active device T2 includes a gate, a channel, a source, and a drain (not shown), and the pixel electrode PE2 is electrically connected to the drain of the active device T2 through a contact window C2 penetrating the insulation layers 104 and 106. Here, the common electrode CM has an opening O2, such that the contact window C2 penetrating the insulation layers 104 and 106 is not in electrical contact with the common electrode CM.

As described above, in the present embodiment, the common electrode CM is disposed below the pixel electrode PE2, and the common electrode CM and the pixel electrode PE2 are isolated from each other by the insulation layer 106. In addition, the pixel electrode PE2 has at least one slit pattern ST2 that extends toward a direction D2. Since the slit pattern ST2 of the pixel electrode PE2 has one single extension direction D2, the second pixel P2 has one domain. According to the present embodiment, the common electrode CM is disposed below the pixel electrode PE2, and the slit pattern ST2 is formed in the pixel electrode PE2, for instance; however, the invention is not limited thereto. According to another embodiment, the common electrode CM may also be disposed above the pixel electrode PE2, and the slit pattern ST2 may be formed in the common electrode CM.

The third pixel P3 includes an active device T3, a pixel electrode PE3, and a common electrode CM. According to the present embodiment, the common electrode CM is disposed on the insulation layer 104, the pixel electrode PE3 is correspondingly disposed above the common electrode CM, and the pixel electrode PE3 and the common electrode CM are isolated from each other by the insulation layer 106. The pixel electrode PE3 is electrically connected to the active device T3. Similarly, the active device T3 includes a gate, a channel, a source, and a drain (not shown), and the pixel electrode PE3 is electrically connected to the active device T3 through a contact window C3 penetrating the insulation layers 104 and 106. Here, the common electrode CM has an opening O3, such that the contact window C3 penetrating the insulation layers 104 and 106 is not in electrical contact with the common electrode CM.

As described above, in the present embodiment, the common electrode CM is disposed below the pixel electrode PE3, and the common electrode CM and the pixel electrode PE3 are isolated from each other by the insulation layer 106. In addition, the pixel electrode PE3 has at least one slit pattern ST3 that extends toward a direction D3. Since the slit pattern ST3 of the pixel electrode PE3 has one single extension direction D3, the third pixel P3 has one domain. According to the present embodiment, the common electrode CM is disposed below the pixel electrode PE3, and the slit pattern ST3 is formed in the pixel electrode PE3, for instance; however, the invention is not limited thereto. According to another embodiment, the common electrode CM may also be disposed above the pixel electrode PE3, and the slit pattern ST3 may be formed in the common electrode CM.

The fourth pixel P4 includes an active device T4, a pixel electrode PE4, and a common electrode CM. According to the present embodiment, the common electrode CM is disposed on the insulation layer 104, the pixel electrode PE4 is correspondingly disposed above the common electrode CM, and the pixel electrode PE4 and the common electrode CM are isolated from each other by the insulation layer 106. The pixel electrode PE4 is electrically connected to the active device T4. Similarly, the active device T4 includes a gate, a channel, a source, and a drain (not shown), and the pixel electrode PE4 is electrically connected to the active device T4 through a contact window C4 penetrating the insulation layers 104 and 106. Here, the common electrode CM has an opening O4, such that the contact window C4 penetrating the insulation layers 104 and 106 is not in electrical contact with the common electrode CM.

As described above, in the present embodiment, the common electrode CM is disposed below the pixel electrode PE4, and the common electrode CM and the pixel electrode PE4 are isolated from each other by the insulation layer 106. In addition, the pixel electrode PE4 has at least one slit pattern ST4 that extends toward a direction D4. Since the slit pattern ST4 of the pixel electrode PE4 has one single extension direction D4, the fourth pixel P4 has one domain. According to the present embodiment, the common electrode CM is disposed below the pixel electrode PE4, and the slit pattern ST4 is formed in the pixel electrode PE4, for instance; however, the invention is not limited thereto. According to another embodiment, the common electrode CM may also be disposed above the pixel electrode PE4, and the slit pattern ST4 may be formed in the common electrode CM.

Figure 5:
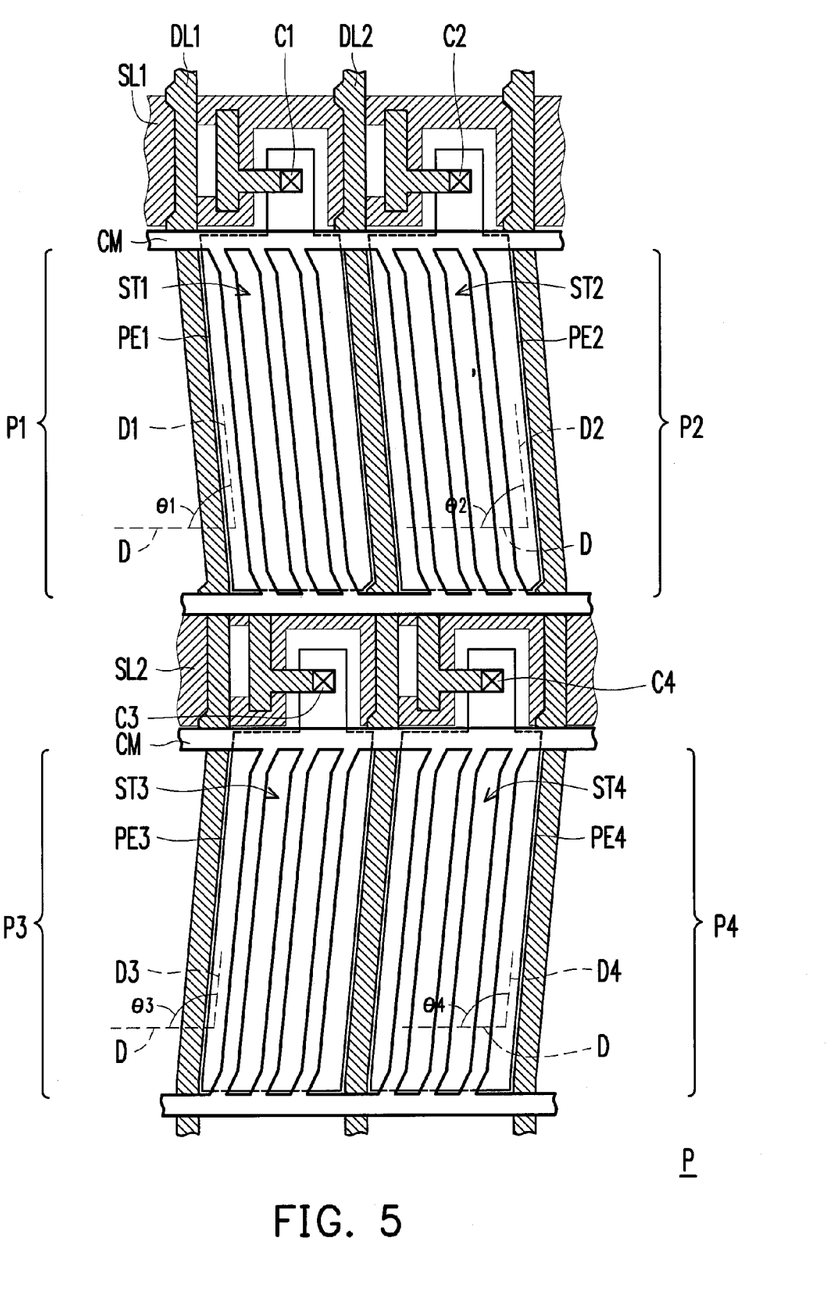
FIG. 5 is a schematic top view illustrating a display panel according to an embodiment of the invention.

In the present embodiment, the common electrode CM corresponding to each of the first, second, third, and fourth pixels P1~P4 is a non-patterned electrode film layer (do not have slit patterns) and is electrically connected to a common voltage Vcom. According to another embodiment, given that the slit patterns ST1~ST4 are formed in the common electrodes CM of the first, second, third, and fourth pixels P1~P4, the common electrodes CM of the first, second, third, and fourth pixels P1~P4 are patterned electrode film layers. Due to the pattern design of the electrode film layers, the common electrodes CM of the first, second, third, and fourth pixels P1~P4 can be electrically connected to the common voltage Vcom, as depicted in FIG. 5. With reference to FIG. 5, in the first, second, third, and fourth pixels P1~P4, the slit patterns ST1~ST4 are formed in the common electrodes CM of the first, second, third, and fourth pixels P1~P4, and the common electrodes CM are located above the pixel electrodes PE1~PE4. Besides, the pixel electrodes PE1~PE4 of the first, second, third, and fourth pixels P1~P4 do not have slit patterns but are lump or block patterns.

In the present embodiment, the extension direction D1 of the slit pattern ST1 of the first pixel P1 is the same as the extension direction D2 of the slit pattern ST2 of the second pixel P2, and the extension direction D3 of the slit pattern ST3 of the third pixel P3 is the same as the extension direction D4 and the slit pattern ST4 of the fourth pixel P4. Additionally, the extension direction D1/D2 is different from the extension direction D3/D4.

If the scan lines SL1~SL2 have an extension direction D in the present embodiment, an included angle θ1 is between the extension direction D1 and the extension direction D, an included angle θ2 is between the extension direction D2 and the extension direction D, an included angle θ3 is between the extension direction D3 and the extension direction D, and an included angle θ4 is between the extension direction D4 and the extension direction D. The included angle θ1 is substantially equal to the included angle θ2, the included angle θ3 is substantially equal to the included angle θ4, and the included angle θ1/θ2 is different from the included angle θ3/θ4. In the present embodiment, the included angle θ3/θ4 is complementary to the included angle θ1/θ2, and one of the included angle θ1/θ2 and the included angle θ3/θ4 is less than 90 degrees and greater than 80 degrees. For instance, if the included angle θ1/θ2 is 85 degrees, the included angle θ3/θ4 is 95 degrees.

In order to allow the pixels P1~P4 to have the optical aperture ratio, the data lines DL1~DLm in the present embodiment extend along the extension direction D1/D2 and the extension direction D3/D4. That is to say, the data lines DL1~DLm of the present embodiment are not extended or arranged in form of straight line but arranged along the extension directions of the slit patterns ST1~ST4 of the pixels P1~P4, and thus the data lines DL1~DLm are extended or arranged in form of bending line. Note that the arrangement of the data lines DL1~DLm is not limited in the invention.

The display panel described herein not only has the pixel array located on the first substrate 100 but also includes the second substrate 200 and the display medium 300. With reference to FIG. 2, the second substrate 200 is located opposite to the first substrate 100. The display medium 300 is located between the first substrate 100 and the second substrate 200. Besides, the display medium 300 includes liquid crystal molecules. According to the present embodiment, the color filter layer CF is disposed on the second substrate 200.

The color filter layer CF includes a first color filter pattern F1 disposed corresponding to the first pixel P1, a second color filter pattern F2 disposed corresponding to the second pixel P2, a third color filter pattern F3 disposed corresponding to the third pixel P3, and a fourth color filter pattern F4 disposed corresponding to the fourth pixel P4. Here, the first, second, and third color filter patterns F1, F2, and F3 are red, green, and blue filter patterns, respectively. The color of the fourth color filter pattern F4 is different from the colors of the first, second, and third color filter patterns F1, F2, and F3. That is to say, the fourth color filter pattern F4 is not red, green, or blue. In fact, the fourth color filter pattern F4 may be a white filter pattern or a yellow filter pattern, preferably the white filter pattern. Moreover, the color filter layer CF may further include a light shielding layer BM correspondingly disposed among the color filter patterns F1~F4.

Namely, in the present embodiment, the extension direction D1 of the slit pattern ST1 of the pixel electrode PE1 in the first pixel P1 corresponding to the first color (red) filter pattern F1 is the same as the extension direction D2 of the slit pattern ST2 of the pixel electrode PE2 in the second pixel P2 corresponding to the second color (green) filter pattern F2; the extension direction D3 of the slit pattern ST3 of the pixel electrode PE3 in the third pixel P3 corresponding to the third color (blue) filter pattern F3 is the same as the extension direction D4 of the slit pattern ST4 of the pixel electrode PE4 in the fourth pixel P4 corresponding to the fourth color (preferably white) filter pattern F4. Additionally, the extension direction D1/D2 is different from the extension direction D3/D4.

Figure 6B:
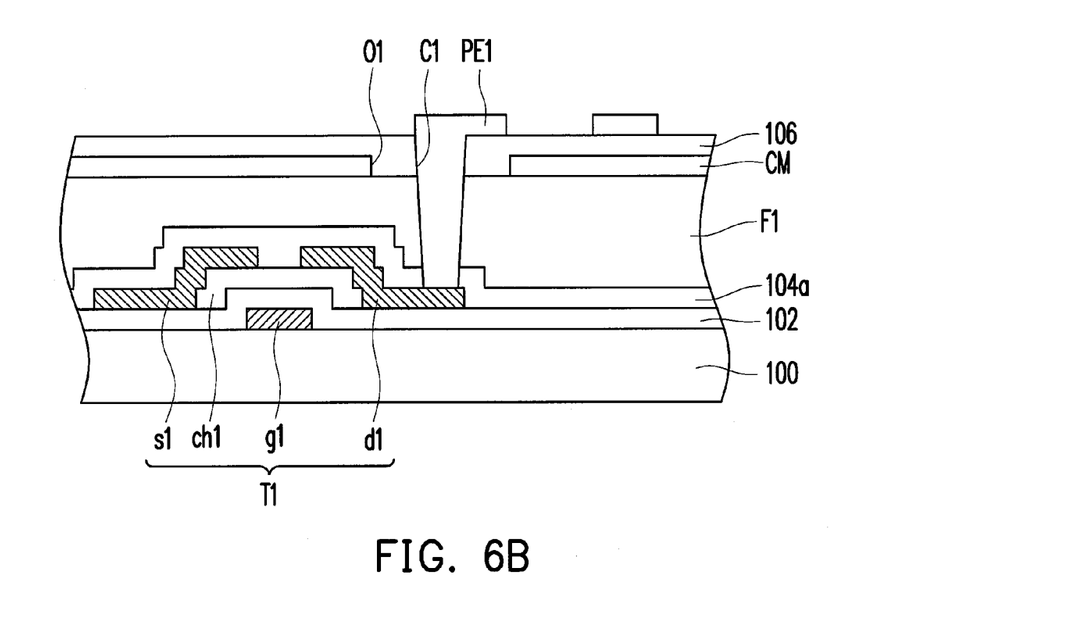
FIG. 6B is a schematic cross-sectional view illustrating a first pixel in a pixel unit according to another embodiment of the invention.

In another embodiment, the color filter layer CF may be disposed on the first substrate 100, as illustrated in FIG. 6B. When the color filter layer CF is disposed on the first substrate 100, the color filter pattern (e.g., the first color filter pattern F1) of the color filter layer CF is disposed above the insulation layer (the passivation layer) 104a, and the pixel electrodes PE1~PE4 and the common electrode CM are disposed above the color filter pattern (e.g., the first color filter pattern F1) of the color filter layer CF. Namely, the color filter layer CF herein may be disposed on the first substrate 100 or the second substrate 200.

From another perspective, the display panel described in the present embodiment may further include polarizers PO1 and PO2. The polarizer PO1 is located on a surface of the first substrate 100, and the polarizer PO2 is located on a surface of the second substrate 200. The polarization direction of the polarizer PO1 (or PO2) is parallel to or perpendicular to the extension direction of the scan lines SL1~SLn. If the polarization direction of the polarizer PO1 (or PO2) is parallel to the extension direction of the scan lines SL1~SLn, an included angle θ is between the polarization direction of the polarizer PO1 (or PO2) and the extension direction D1/D2 of the slit pattern ST1/ST2 of the first/second pixel P1/P2, and an included angle θ' is between the polarization direction of the polarizer PO1 (or PO2) and the extension direction D3/D4 of the slit pattern ST3/ST4 of the third/fourth pixel P3/P4. Here, the included angle θ is complementary to the included angle θ', and one of the included angles θ and θ' is less than 90 degrees and greater than 80 degrees. For instance, if the included angle θ is 85 degrees, the included angle θ' is 95 degrees.

Based on the above, in the present embodiment, the extension direction D1 of the slit pattern ST1 of the pixel electrode PE1 in the first pixel P1 corresponding to the first color (red) filter pattern F1 is the same as the extension direction D2 of the slit pattern ST2 of the pixel electrode PE2 in the second pixel P2 corresponding to the second color (green) filter pattern F2; the extension direction D3 of the slit pattern ST3 of the pixel electrode PE3 in the third pixel P3 corresponding to the third color (blue) filter pattern F3 is the same as the extension direction D4 of the slit pattern ST4 of the pixel electrode PE4 in the fourth pixel P4 corresponding to the fourth color (preferably white) filter pattern F4. Additionally, the extension direction D1/D2 is different from the extension direction D3/D4. Since each of the first, second, third, and fourth pixels P1~P4 has one domain, respectively, the issue of disclination lines in the conventional pixel does not arise herein, and thus the display quality of the display is not deteriorated.

Figure 7:
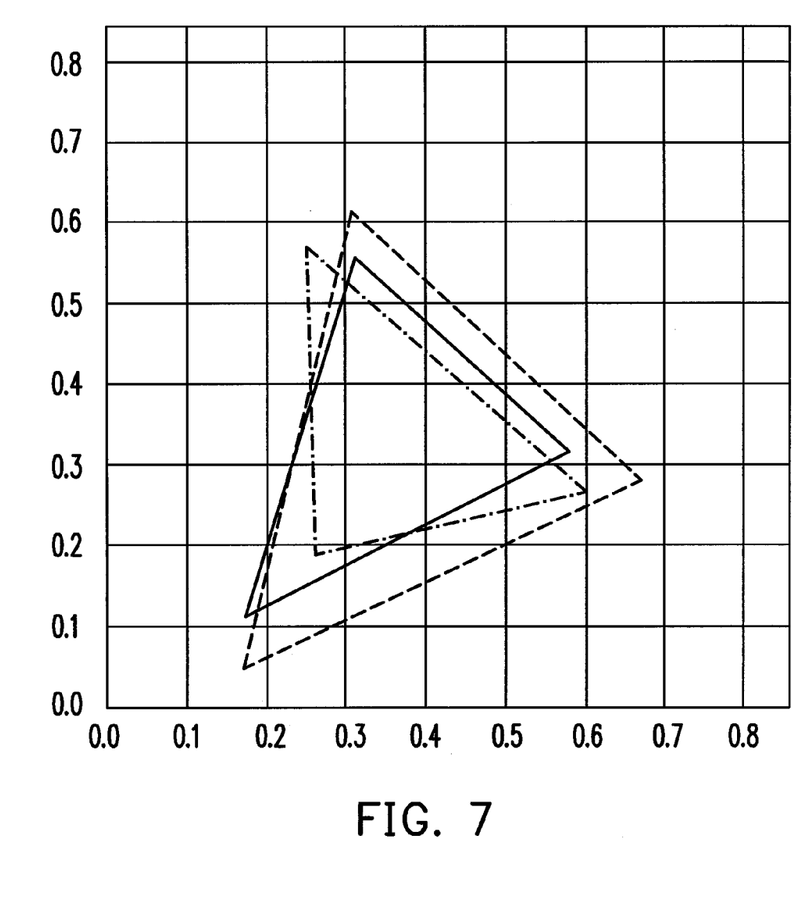
FIG. 7 is a schematic view illustrating a chromatic coordinate diagram of a display panel according to an embodiment of the invention.

Besides, due to the design of the extension directions of the slit patterns ST1~ST4 in the first, second, third, and fourth pixels P1~P4 described herein, the chromatic coordinates of the pixels at large viewing angles can be adjusted, and the chromatic coordinate of the white light can be further controlled, as indicated in FIG. 7. To be more specific, when a user watches the display panel at a large viewing angle, the chromatic coordinates (shown by solid lines—chromatic coordinate and dotted lines—chromatic coordinate) of the first and second pixels P1 and P2 (red and green) shift in the same direction. Since the extension direction of the slit patterns of the first and second pixels P1 and P2 (red and green) is different from the extension direction of the slit patterns of the third and fourth pixels P3 and P4 (blue and white), the chromatic coordinates (shown by dotted lines—chromatic coordinate) of the third and fourth pixels P3 and P4 (blue and white) shift in a reverse direction. Thereby, color shift can be reduced. Besides, if a white filter pattern is disposed corresponding to the fourth pixel P4, the overall transmittance of the display panel can be enhanced.

Figure 3:
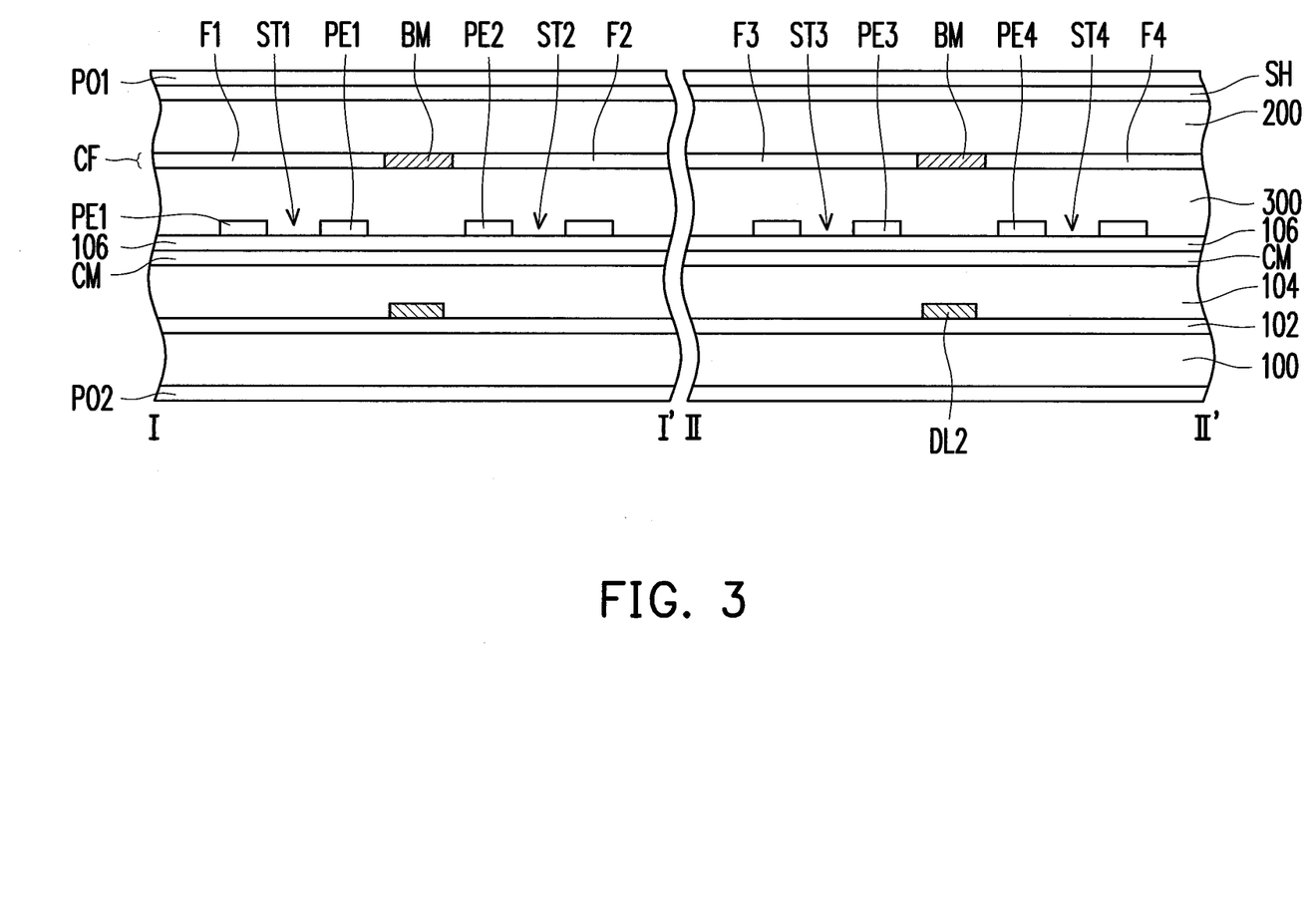
FIG. 3 and FIG. 4 are schematic cross-sectional views illustrating a display panel according to other embodiments of the invention.

FIG. 3 is a schematic cross-sectional view illustrating a display panel according to another embodiment of the invention. The embodiment shown in FIG. 3 is similar to the embodiment shown in FIG. 2, and therefore identical components will be denoted by the same numerals and not repeated herein. With reference to FIG. 3, in the present embodiment, the second substrate 200 further includes at least one shielding electrode layer SH entirely covering the second substrate 200. Hence, the shielding electrode layer SH shields the first, second, third, and fourth pixels P1~P4 corresponding to the first, second, third, and fourth color filter patterns F1~F4. According to the present embodiment, the shielding electrode layer SH covers the color filter layer CF and includes metal oxide, such as indium tin oxide (ITO), indium zinc oxide (IZO), aluminum tin oxide (ATO), aluminum zinc oxide (AZO), indium germanium zinc oxide, another suitable oxide, or a stacked layer of at least two of the above-mentioned materials.

Figure 4:
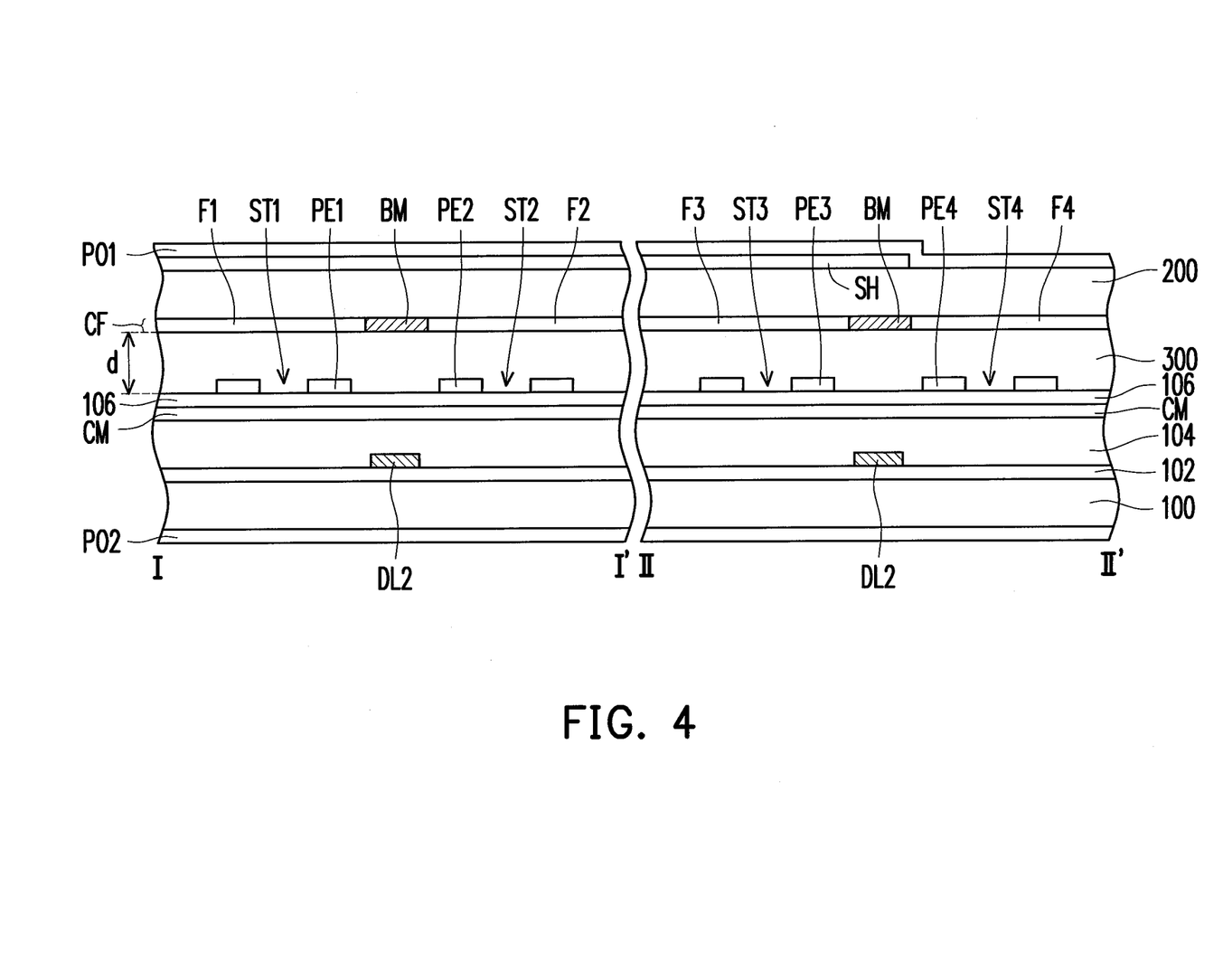

FIG. 4 is a schematic cross-sectional view illustrating a display panel according to another embodiment of the invention. The embodiment shown in FIG. 4 is similar to the embodiment shown in FIG. 3, and therefore identical components will be denoted by the same numerals and not repeated herein. With reference to FIG. 4, in the present embodiment, the shielding electrode layer SH disposed on the second substrate 200 does not entirely cover the second substrate 200. In the present embodiment, the shielding electrode layer SH shields the first, second, and third pixels P1~P3 corresponding to the first, second, and third color filter patterns F1~F3 but does not cover the fourth pixel P4 corresponding to the fourth color filter pattern F4.

In the embodiments shown in FIG. 3 and FIG. 4, the pixel array on the first substrate 100 is the same as the pixel array shown in FIG. 1 and FIG. 2; therefore, according to the embodiments shown in FIG. 3 and FIG. 4, the color shift issue arising in the display panel when an image on the display panel is viewed at the large viewing angle can be resolved to a better extent, and the issue of disclination lines in the conventional pixel does not arise herein. Furthermore, the shielding electrode layer SH provided in the embodiments shown in FIG. 3 and FIG. 4 can prevent electro-magnetic interference (EMI).

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A display panel comprising:
a first substrate;
a plurality of scan lines and a plurality of data lines, disposed on the first substrate;
a plurality of pixel units electrically connected to the scan lines and the data lines, each of the pixel units comprising a first pixel, a second pixel, a third pixel and a fourth pixel, and the first pixel, the second pixel, the third pixel and the fourth pixel respectively comprising:
an active device;
a pixel electrode electrically connected to the active device; and
a common electrode disposed corresponding to the pixel electrode, one of the pixel electrode and the common electrode having at least one slit pattern,
wherein the slit pattern of the first pixel and the slit pattern of the second pixel have a first extension direction, the slit pattern of the third pixel and the slit pattern of the fourth pixel have a second extension direction, and the first extension direction is different from the second extension direction;
a second substrate located opposite to the first substrate;

a display medium located between the first substrate and the second substrate; and a color filter layer comprising a first color filter pattern disposed corresponding to the first pixel, a second color filter pattern disposed corresponding to the second pixel, a third color filter pattern disposed corresponding to the third pixel, and a fourth color filter pattern disposed corresponding to the fourth pixel, wherein the color of the fourth color filter pattern is different from the colors of the first, second, and third color filter patterns.

2. The display panel as recited in claim 1, wherein the color filter layer is located on the second substrate.

3. The display panel as recited in claim 1, wherein the color filter layer is located on the first substrate.

4. The display panel as recited in claim 1, wherein the color filter layer covers the active devices of the first pixel, the second pixel, the third pixel and the fourth pixel, and the pixel electrodes or the common electrodes of the first pixel, the second pixel, the third pixel and the fourth pixel are disposed above the color filter layer.

5. The display panel as recited in claim 1, wherein an included angle between an extension direction of the scan lines and the first extension direction is complementary to an included angle between the extension direction of the scan lines and the second extension direction.

6. The display panel as recited in claim 5, wherein the included angle between the extension direction of the scan lines and the first extension direction or the included angle between the extension direction of the scan lines and the second extension direction is greater than 80 degrees and less than 90 degrees.

7. The display panel as recited in claim 1, wherein the first color filter pattern, the second color filter pattern and the third color filter pattern are respectively a red filter pattern, a green filter pattern and a blue filter pattern, and the fourth color filter pattern is not the red, green, or blue filter pattern.

8. The display panel as recited in claim 7, wherein the fourth color filter pattern is a white filter pattern.

9. The display panel as recited in claim 1, wherein the first, second, third and fourth pixels of the pixel units are arranged in a plurality of columns and a plurality of rows, the first pixel and the second pixel of each of the pixel units are arranged in one of the rows, and the third pixel and the fourth pixel of each of the pixel units are arranged in another one of the rows.

10. The display panel as recited in claim 9, wherein the third pixel and the fourth pixel are arranged in the another one of the rows following the one of the rows where the first pixel and the second pixel are arranged.

11. The display panel as recited in claim 1, wherein the data lines extend along the first extension direction and the second extension direction.

12. The display panel as recited in claim 1, further comprising at least one polarizer located on at least one of the first substrate and the second substrate, a polarization direction of the polarizer being parallel to or perpendicular to an extension direction of the scan lines.

13. The display panel as recited in claim 1, further comprising at least one shielding electrode layer located on the second substrate, the shielding electrode layer being correspondingly disposed above the first pixel, the second pixel, and the third pixel but not disposed above the fourth pixel.

14. The display panel as recited in claim 1, further comprising at least one shielding electrode layer entirely covering the second substrate.

* * * * *